United States Patent
Maalderink et al.

(10) Patent No.: US 9,205,599 B2
(45) Date of Patent: Dec. 8, 2015

(54) SYSTEM AND METHOD FOR PRODUCING A TANGIBLE OBJECT

(75) Inventors: Herman Hendrikus Maalderink, Nuenen (NL); Jasper Joost Michels, 's-Hertogenbosch (NL); Ronaldus Jacobus Johannes Boot, Son en Breugel (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 25 days.

(21) Appl. No.: 12/306,235

(22) PCT Filed: Jul. 6, 2007

(86) PCT No.: PCT/NL2007/050334
§ 371 (c)(1),
(2), (4) Date: Apr. 7, 2009

(87) PCT Pub. No.: WO2008/004872
PCT Pub. Date: Jan. 10, 2008

(65) Prior Publication Data
US 2009/0289384 A1    Nov. 26, 2009

(30) Foreign Application Priority Data
Jul. 7, 2006 (EP) ..................................... 06076377

(51) Int. Cl.
*B29C 67/00* (2006.01)
*G05B 19/23* (2006.01)
(Continued)

(52) U.S. Cl.
CPC ............. *B29C 67/0066* (2013.01); *B23Q 17/20* (2013.01); *B29C 45/76* (2013.01);
(Continued)

(58) Field of Classification Search
CPC ............ B29C 67/0088; B29C 67/0066; B29C 67/0092; B29C 45/766; B29C 45/80; B29C 45/76; B29C 35/0805; G05B 2219/49013; G05B 19/4099; G05B 19/182; G05B 19/19; G05B 19/235; G05B 19/237; G05B 19/404; B22F 3/008; B30B 11/005; B23Q 17/20
USPC ...................... 425/174.4, 375, 149, 150, 170; 264/113, 308, 401, 497, 40.7; 700/118–120, 163, 195
See application file for complete search history.

(56) References Cited

U.S. PATENT DOCUMENTS 5,164,128 A * 11/1992 Modrek et al. ................. 264/401
5,198,159 A * 3/1993 Nakamura et al. ............ 264/401
(Continued)

FOREIGN PATENT DOCUMENTS

DE    199 29 199 A1    1/2001
DE    10204985 A1    8/2003
(Continued)

OTHER PUBLICATIONS

Huang et al.; On-line Force Monitoring of Platform Ascending Rapid Prototyping System; 2005; Journal of Materials Processing Technology; Edition 159; pp. 257-263.*
(Continued)

*Primary Examiner* — James Sanders
*Assistant Examiner* — Ninh Le
(74) *Attorney, Agent, or Firm* — Pearne & Gordon LLP

(57) ABSTRACT

A system for producing a tangible object. The system has a space which can be filled with a fluid. A reference platform at least partially defines at least one side of the space. The system further has a phase-transformer which can form a layer of the object by selectively transforming the fluid into a solid in a predetermined area of the space. An actuator can separate the layer from the reference platform by moving the layer relative to the reference platform or vice versa. The system has a controller connected with an actuator control output to the actuator and/or with a transformer control output to the phase transformer. The controller can control the production of the object based on a determined value of the force exerted on the reference platform or the solid or of a parameter related to the force.

24 Claims, 3 Drawing Sheets

(51) Int. Cl.

| | |
|---|---|
| B23Q 17/20 | (2006.01) |
| B29C 45/76 | (2006.01) |
| G05B 19/19 | (2006.01) |
| G05B 19/404 | (2006.01) |
| G05B 19/4099 | (2006.01) |
| B29C 45/80 | (2006.01) |

(52) U.S. Cl.
CPC .............. *B29C 45/766* (2013.01); *B29C 45/80* (2013.01); *B29C 67/0062* (2013.01); *B29C 67/0088* (2013.01); *B29C 67/0092* (2013.01); *G05B 19/19* (2013.01); *G05B 19/235* (2013.01); *G05B 19/237* (2013.01); *G05B 19/404* (2013.01); *G05B 19/4099* (2013.01)

(56) References Cited

U.S. PATENT DOCUMENTS

| | | | | |
|---|---|---|---|---|
| 5,237,311 | A | * | 8/1993 | Mailey et al. .................. 345/167 |
| 5,447,822 | A | | 9/1995 | Hull et al. |
| 5,684,713 | A | * | 11/1997 | Asada et al. ..................... 716/19 |
| 5,762,856 | A | | 6/1998 | Hull |
| 5,870,307 | A | * | 2/1999 | Hull et al. ...................... 700/182 |
| 5,876,550 | A | | 3/1999 | Feygin et al. |
| 6,617,531 | B1 | * | 9/2003 | Aoki ............................. 177/144 |
| 2002/0153640 | A1 | * | 10/2002 | John ............................. 264/401 |
| 2004/0118309 | A1 | | 6/2004 | Fedor et al. |
| 2005/0208168 | A1 | | 9/2005 | Hickerson et al. |
| 2009/0020901 | A1 | | 1/2009 | Schillen |

FOREIGN PATENT DOCUMENTS

| | | |
|---|---|---|
| DE | 10256672 A1 | 6/2004 |
| EP | 1 674 243 A2 | 6/2006 |
| EP | 1 852 243 A2 | 11/2007 |
| EP | 1 876 012 A1 | 1/2008 |
| JP | 01028513 A * | 1/1989 |
| JP | 08 150662 A | 6/1996 |
| WO | 2008/004872 A1 | 1/2008 |
| WO | 2008010708 | 1/2008 |

OTHER PUBLICATIONS

Huang, et al., "On-Line Force Monitoring of Platform Ascending Rapid Prototyping System", Journal of Materials Processing Technology, vol. 159, 2005, pp. 257-264.

Jeng, et al., "Developing a New Direct Mask-Base Photocuring Rapid Prototyping System", 2002 IEEE/ASME International Conference on Advanced Manufacturing Technologies and Education, 2002, pp. 1-6.

You-Min Huang, et al., "Computer Supported Force Analysis and Layer Imagine for Masked Rapid Prototyping System", in: Proceedings of the 6th International Conference on CSCW in Design, London, Ontario, Canada, Jul. 12-14, 2001, pp. 562-567, Publication Year 2001, ISBN 0 660 18493 1.

Notice of Opposition filed on Jan. 14, 2013 by Nederlandse Organisatie voor toegepast-natuurwetenschappelijk onderzoek TNO (the Assignee of the present U.S. Appl. No. 12/306,235) against EP 2011631 (entitled "Process and device for producing a three-dimensional object"), p. 1-7 with Annex of pp. 1-29.

Notice of Opposition filed on Sep. 12, 2013 by Nederlandse Organisatie voor toegepast-natuurwetenschappelijk onderzoek TNO (the Assignee of the present U.S. Appl. No. 12/306,235) against EP 2173538 (entitled "Device for producing a three-dimensional object"), p. 1-7 with Annex of pp. 1-29.

\* cited by examiner

SYSTEM AND METHOD FOR PRODUCING A TANGIBLE OBJECT

FIELD AND BACKGROUND OF THE INVENTION

The invention relates to a system and a method for producing a tangible three-dimensional object, such as a tangible model.

It is known in the field of Layered Manufacturing Technology (LMT)—often referred to as Rapid Prototyping (RP) or Rapid Manufacturing (RM)—to produce a tangible object. Rapid Prototyping (RP) and Rapid Manufacturing (RM), are called "Rapid" since they do not require a mould to be designed and manufactured.

An example of a LMT technique is the Stereo Lithography Apparatus (SLA). In SLA an object is produced by curing successive layers of a liquid resin in a suitable shape and size. The SLA includes a laser, which is used to cure a layer in the desired shape and size by moving the laser beam over the surface of a bath of photocurable resin. The movement of the beam over the surface is controlled to correspond to a CAD/CAM slice pattern of a designed 3D digital model of the object to be produced. Accordingly, the resin is cured in the shape of the respective slice pattern of the 3D digital model. After each curing step, the building platform supporting the object being produced is lowered, below the liquid level in the bath. The liquid resin will flow over the top surface of the object, forming a new resin layer. The new resin layer may then be cured corresponding to another CAD/CAM slice pattern.

However, a disadvantage of SLA is the long period of time required to produce the object. A reason for the low speed of the SLA is the fact that the laser has to "write" the slice patterns. Especially when large surfaces are required, this is relatively time consuming. Another shortcoming of the SLA is the long time for the resin surface to settle and straighten after lowering the object below the liquid level, and hence forming a new resin layer takes a relatively long time.

In the art of LMT, also an apparatus is known, sold by Envision Technologies GmbH, Germany under the name "Perfactory", in which the disadvantages of the SLA are obviated. The apparatus employs, instead of a laser, a mercury lamp in combination with a micro-mirror array to project the desired slice pattern onto the surface of the photo-curable resin. Accordingly, a layer of resin is photo-cured more or less simultaneously, and hence faster than when writing a pattern with a laser beam.

The Perfactory further illuminates the resin bath from below, through a transparent glass plate covered with a transparent rubbery (silicone) anti-stick membrane. After curing, the glass plate is released from the freshly cured layer by means of automated pulling and liquid resin flows in the space between the glass plate and the freshly cured layer, thus forming the next layer to be cured. Accordingly, the resin layer is settled and straightened by the freshly cured layer and the glass plate when flowing into the space, and hence in a shorter time than in the SLA.

However, a common disadvantage of both the SLA and the Perfactory, is that it takes a relatively long period of time to produce the object. Typically, a cycle of producing a cured resin layer of about 25-150 micron takes about 15 to 40 seconds. Hence, already a small object of about 20 centimetres requires about 20 to 40 hours to be produced.

SUMMARY OF THE INVENTION

It is an object of the invention to enable a faster production of a tangible object. Therefore, according to a first aspect of the invention, a system according to claim 1 is provided. Furthermore, according to a second aspect of the invention a controller according to claim 17 is provided. According to a third aspect of the invention, a method according to claim 18 is provided. According to a fourth aspect, a computer program product according to claim 20 is provided.

The object can be produced faster, because a suitable period or moment in time for an action in the production can be determined from the force exerted on the reference platform or the solid or from a parameter related to the force. Hence, there is no need to use the same preset period or moment for all layers, and the period of time required to produce a layer can be adapted to a specific layer. Accordingly, the period of time required to produce the object can be reduced. A second reason that the object can be built faster is, that the relative speed of movement between the carrier platform and the reference platform can be increased and optimized to suit the specific geometry and material of the object that is built.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION

Figure 1:
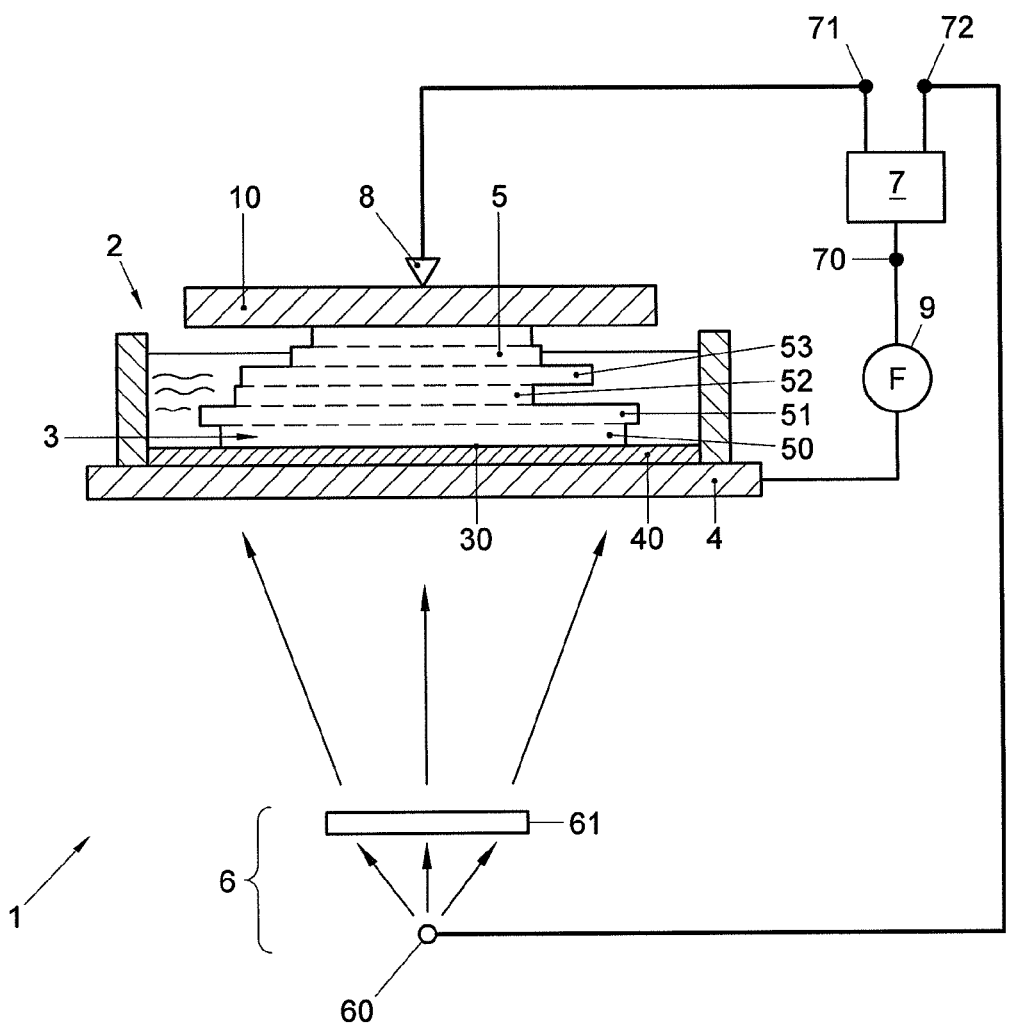
FIG. 1 schematically shows a sectional side view of an example of an embodiment of a system according to the invention.

FIG. 1 shows an example of a system 1, for producing a tangible object. In this figure, the object 5 is shown while being produced. The tangible object 5 may for example be a prototype or model of an article of manufacture or other suitable type of object. The system 1 may, as shown in FIG. 1, include a basin 2 in which a liquid can be provided. In the example of FIG. 1, the basin 2 includes a space 3 which can be filled with the liquid, to form a layer of fluid which can be transformed into a solid layer. At least one side 30 of the space 3 is at least partially defined by a reference platform 4. In this example the reference platform 4 defines the bottom side of the space 3.

However, it is also possible that the reference platform 4 defines the top side of the space 3. In this example, the reference platform 4 includes an anti-stick layer 40, such as a rubber-like layer or a silicon layer, which forms a wall of the space and reduces the sticking of the layer 50 to the reference platform 4 and hence facilitates separation of the layer 50.

The system 1 further includes a phase-transformer 6. The phase transformer 6 can form a layer 50 of the object 5 by selectively transforming the fluid in the space 3 into a solid in a predetermined area of the space 3. Thus, a solid layer of a desired size and shape can be obtained.

The system 1 includes an actuator 8 which can move the layer 50 relative to the reference platform 4 or vice versa.

Thereby, for example, the layer 50 may be separated from the reference platform 4 or the space 3 between the reference platform 4 and the separated layer 50 may be formed such that, for instance, the distance between the reference platform 4 and the separated layer 50 is suitable to obtain a following layer with a desired thickness. In the example of FIG. 1, for instance, the object 5 which is being produced is suspended on a carrier platform 10. By moving the carrier platform 10 towards or away from the space 3, the object 5 and the layer 50 can be moved towards or separated from the reference platform 4. Initially, at the beginning of the production of the object 5, the carrier platform 10 defines an opposite side of the space 3 opposite to the side 30 defined by the reference platform 4. Once one or more of the layers 50-53 are formed, the outer layer 50 of the stacking of layers 50-53, in FIG. 1 the lowermost layer 50, defines this opposite side. In the example of FIG. 1, the carrier platform 10 is provided at the opposite (top)side of the space 3 and the reference platform 4 defines a bottom side 30 of the space. The carrier platform 10 can be moved upwards and/or the reference platform downwards, for example to separate the layer 50 from the reference platform 4.

The system 1 can perform an example of a method for producing a tangible object. The method may for example include forming successive layers 50-53 with a predetermined shape. The layers 50-53 may for example be formed by filling the space 3 with a liquid and transforming the liquid in the space 3 into a solid in a predetermined area of the space 3 corresponding to the predetermined shape. Thereby a respective layer 50-53 can be formed. Thereafter, the solid may be separated from the reference platform 4, by moving the platform away from the layer 50. After forming a layer 50, the cycle may be repeated to form a following layer. For example, the solid layer may be moved away from the reference platform 4, e.g. upwards in the example of FIG. 1, to create the space in which the following layer can be formed, and the cycle of phase transformation and separation may be repeated with a predetermined area corresponding to the desired shape and size of the following layer of the object 5.

The system 1 further includes a controller 7. The actuator 8 and the phase-transformer 6 are connected to respective controller outputs 71, 72 of the controller 7. The controller 7 can control the production of the object 5 based on a determined value of the force exerted on the reference platform 4 or the layer 50 or based on a parameter related to this force, e.g. the acceleration or the shape and/or surface area of the layer 50 that is being formed. The determined value may be determined in any suitable manner. For instance, the controller 7 may receive a measurement value from a sensor 9. In the example of FIG. 1, for instance, the controller 7 is connected with a controller input 70 to a force sensor 9. The force sensor can measure the force exerted on the reference platform 4 relative to the object 5 and output to the controller 7 a measured value of the force. Based on this measured value, the controller can control, for example, the actuator 8 or the phase-transformer 6.

However, it is also possible that the controller 7 does not receive a measured value, but a value determined from, e.g., a model of the forces acting on the solid (e.g. the object 5) or the reference platform 4 and the desired shape and size of the layer to be formed. For example, the controller 7 may include a memory in which such a model is stored, and receive, for example from a computer communicatively connected to the controller, data representing a slice of a 3D digital model of the object. The data may subsequently be inputted to the force model to calculate the forces, for example as a function of time and control the system 1 based on the calculated forces.

The system 1 has, compared to the conventional systems described above, an increased production speed, because the controller 7 can control the production of the object 5 based on a determined value of the force exerted on the reference platform 4 or on the solid layer or of a parameter related to this force, e.g. the acceleration or the shape and/or surface area of the layer 50 that is being formed, as is explained below in more detail. The prior art systems use preset times for each sub-process, and moreover, have preset waiting times between sub-processes, indicated in FIG. 2 with arrows w1,w2, in order to ensure that the respective sub-processes are finished before the successive sub-process is initiated. Accordingly, a relatively large amount of time is required to produce a layer. By controlling the system 1 based on a determined value of the force exerted on the reference platform 4 or the solid or of a parameter related to this force, when a sub-process is or will be finished can be determined or predicted in a simple manner and accordingly the period of time for a sub-process be adjusted to a specific layer.

Figure 2:
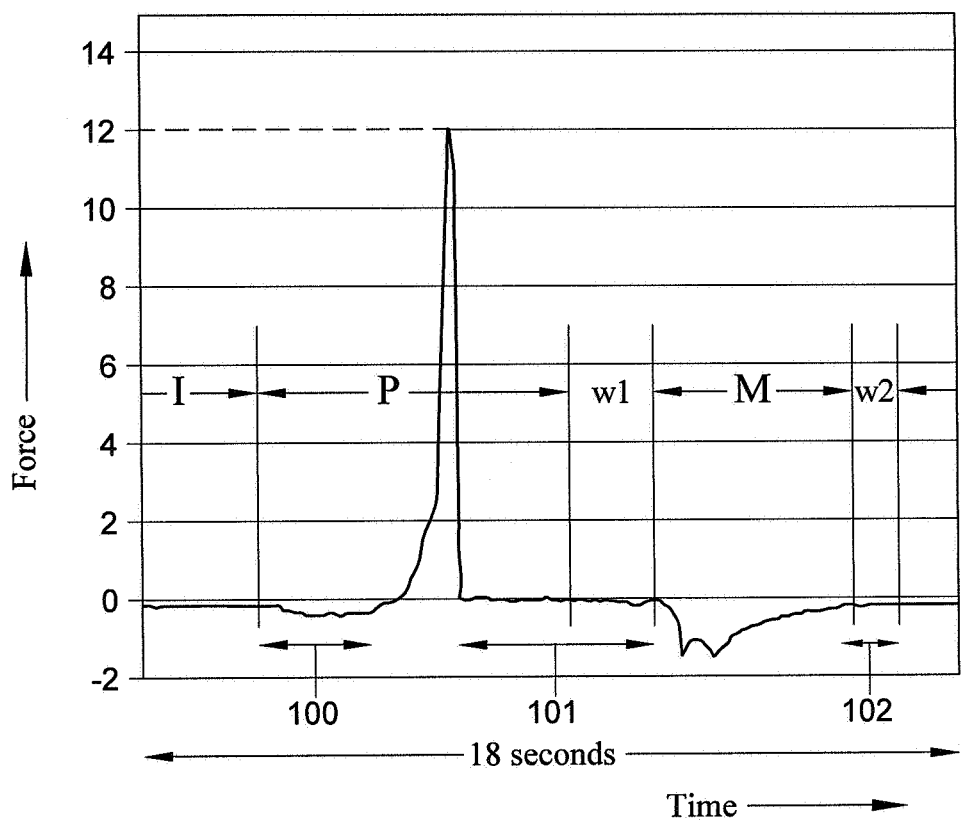
FIG. 2 schematically shows an example of a measurement of the forces between the reference platform and the object being formed during a cycle of forming a layer in a conventional apparatus.

FIG. 2 schematically shows a graph of the measured force between the reference platform and the object being formed during a cycle of forming a layer in a conventional apparatus. In FIG. 2, arrow I indicates a phase-transforming process, during which, for example, a desired pattern of radiation may be projected on the liquid in the space 3, in order to activate a chemical or physical process which results in a solid-phase layer in a predetermined area corresponding to the desired pattern. Once the solid-phase layer 50 is obtained, the layer 50 is separated from the reference platform 4 during a separation sub-process, denoted with arrow P in FIG. 2. Thereafter, in the sub-process denoted with arrow M, the space 3 is set to a desired dimension, for example by moving the layer 50 upwards in FIG. 1 and positioning the reference platform in the same position as before the separation phase P.

As indicated in FIG. 2 with arrows 100-102, in the conventional system, due to the preset periods of the sub-processes, the system is idle during a significant amount of the cycle, to ensure, for example, a good separation of the reference platform 4 from the layer 50 or to ensure that the space 3 is filled entirely with the fluid. Accordingly, by controlling the system 1 based on the determined force, the idle time can be reduced. It is believed that the period of time required for a cycle of producing a single layer can be reduced by approximately 50% because of the controller 7, and for example take less than 10 seconds.

The controller 7 may for example control the phase-transformator 6 to solidify, e.g. to cure a liquid resin, the fluid in the space 3 during a predetermined time (for example based on the thickness of the layer 50 to be transformed into a solid). Thereafter, the solidified layer 50 may be separated from the reference platform 4 by moving the reference platform 4 away from the layer 50 by the actuator 8. This separation may be controlled by the controller 7. For example, the controller 7 may receive the measured value and compare the value with a reference value stored in a memory of the controller 7. Once the force is determined to become below a reference value, e.g. zero., the separation may be terminated and the sub-process M may be started by the controller 7. (In this respect, in case the force becomes zero, of course, the acceleration becomes zero and the velocity becomes constant and hence such parameters may also be used to control the system 1). Also, the sub-process M may be terminated in case the force becomes zero and the phase transformation for the following layer be started, since the fluid is then believed to have filled the space sufficiently. For example, in the separation process, the reference platform 4 may be moved away from the formed layer 50 by the actuator 8 under control of the controller 7. In the sub-process M, the reference platform 4 may be moved towards the formed layer, in order to set the width of the spacing 3 between the formed layer 50 and the reference platform 4 to a suitable value.

As mentioned above, the determination of the value of the force exerted on the reference platform or the solid or of the parameter related to the force can be realised by means of measurement (e.g. using a force sensor, as explained) or by means of calculative prediction (e.g. using a predictive model of the forces, as explained).

However, other ways for determination of said value are also possible. Examples of these other ways are now explained, wherein, as an example, said value to be determined is the earlier discussed reference value (e.g. zero) indicating that the separation sub-process P may be terminated and the sub-process M may be started in order to reduce idle time. Determination of said reference value may be realised by different suitable techniques, for example based on an optical distance measurement of the fluid gap or of the position of a geometrically related part of the system. Another such technique can be based upon the introducing of vibrations via the carrier platform in combination with the measuring of resulting vibrations in the reference platform, or vice versa, in order to detect via such vibration measurements a substantial change of connection between the reference platform and the solidified layers.

It is remarked that two or more of such different determination techniques as mentioned above (measurement; calculative prediction; other techniques, such as optical or vibration-related ones), can be combined with one another in a single system for producing a tangible object or in a single run of a method for producing a tangible object.

The controller 7 may be implemented in any suitable manner. The example of a controller 7 in FIG. 3 includes for instance a first comparator 73 which is connected with a comparator input 731 to the controller input 70 and with another comparator input 732 to a memory 730 in which a suitable reference value is stored. The first comparator 73 is connected with a comparator output 733 to an actuator control unit 74. The first comparator 73 compares the measured value received at the controller input 70 with the reference value stored in the memory 730. Depending on the result of the comparison, a signal is transmitted via the comparator output 733 to the actuator controller 74. In response to the signal, the reference platform 4 is moved away from the layer 50 or this movement is stopped by the actuator 8. Subsequently, the actuator controller may start a movement of the reference platform 4 back towards the layer 50. Once the reference platform 4 is moved to its original position, the reference platform 4 may be kept in position.

Figure 3:
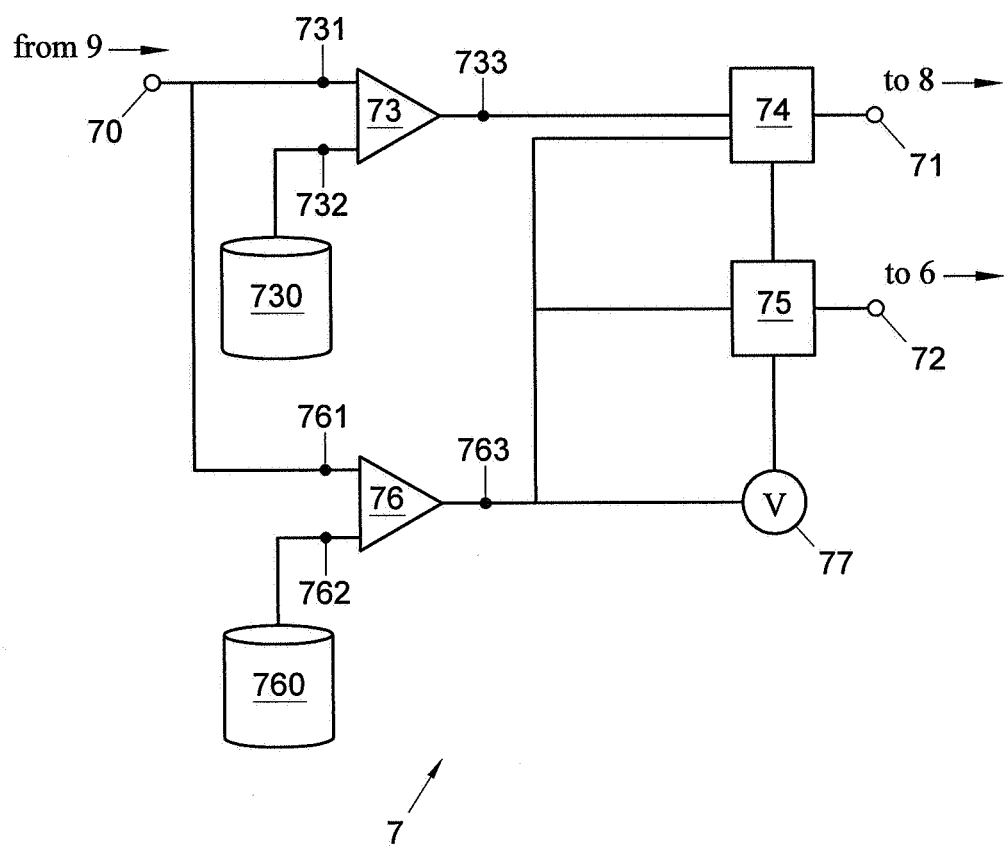
FIG. 3 schematically shows a block diagram of a controller suitable for the example of FIG. 1.

The example of a controller 7 in FIG. 3 further includes a second comparator 76 which is connected with a comparator input 761 to the controller input 70 and with another comparator input 762 to a memory 760 in which a suitable reference value is stored. The second comparator 76 is connected with a comparator output 763 to a timer 77, a phase-transformer control unit 75 and to the actuator control unit 74. Once the reference platform 4 is moved back to its original position, the first comparator 76 compares the measured value received at the controller input 70 with the reference value stored in the memory 760. Depending on the result of the comparison, a signal is transmitted via the comparator output 763 to the timer 77 and the phase-transformer controller 75, to start the timer and activate the controller 75. The reference value may for example represent a force of zero Newton. Without wishing to be bound to any theory, it is believed that once the reference platform 4 is back to its initial position, the fluid in the spacing 3 between the reference platform 4 and the formed layer 50 will continue to flow during a period of time and exert a force on the reference platform 4 and the formed layer 50, i.e. the parts of the system defining the space. The fluid may for example continue to flow out of the spacing 3 into the basin 2. Once the fluid stops flowing, the force becomes zero. Accordingly, by comparing the measured value by the second comparator 76 with a threshold corresponding to zero, the moment at which the fluid stops flowing can be determined accurately for a specific layer, and accordingly the idle time be reduced. Once the fluid stops flowing, the phase-transformation of the fluid in the spacing 3 may be started by the phase-transformation controller 75 and the timer 77 be started.

The controller may further include a comparator connected to the control input and to a memory in which a force threshold is stored, which can be used to limit the movement or the velocity of the movement to a certain threshold, in order to keep the force acting on the object 5 below a damage threshold and accordingly reduce the chance of damaging the object. For example, as shown in FIG. 2, during separation a peak force occurs. By controlling the actuator such that the parameter value is kept below the value corresponding to the peak force, damage to the object can be prevented or at least the risk thereof be reduced.

The sensor may be implemented in any suitable manner. The sensor may for example include a force sensor for measuring a force parallel or opposite to a direction of movement of the layer or the reference platform. The sensor may include a three-point force measurement system. Thereby an accurate measurement of the forces can be obtained.

The reference platform 4 may be moved by the actuator 8 in any suitable manner. The reference platform 4 may for example be pivoted relative to the layer, for at least partially separating the reference platform and the layer. However, the reference platform 4 may also be moved along a straight line without rotation or be moved in any other manner suitable to e.g. separate the platform from the layer or to provided a space between the reference platform and the layer in which a following layer of the object can be produced.

The phase-transformer 6 can use any suitable chemical or physical process to transform the fluid in the space 3 into a solid. The phase transformer 6 may for exampel initiate a chemical reaction of a component in the fluid which results in a solid reaction product. For example, the basin may contain a liquid resin which can be cured by electromagnetic radiation, for example a photo-polymer of which polymerisation can be activated by projecting light of a suitable wavelength.

The fluid can be transformed into a solid by a suitable type of energy and the phase-transformer may include a source of energy which can selectively provide the energy to the predetermined area. The source of energy may for example include a source of electromagnetic radiation. In the example of FIG. 1, for instance, the phase-transformer 6 includes a light source 60 which can emit light which is projected in the space 3 via a projection unit 61 in a pattern corresponding to the desired shape and size of the layer 50. To enable the light, or other radiation, to enter the space 3, the reference platform 4 may include a window which is transparent to the radiation.

The invention may also be implemented in a computer program for running on a computer system, at least including code portions for performing steps of a method according to the invention when run on a programmable apparatus, such as a computer system or enabling a programmable apparatus to perform functions of a device or system according to the invention. Such a computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the basin may be higher or lower than shown in FIG. 1. Furthermore, the object may have any suitable size and shape.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the controller 7 may include a separate apparatus which operates as the actuator control unit 74 and another apparatus which operates as the phase-transformer control unit 75.

Also, devices functionally forming separate devices may be integrated in a single physical device. For example, the controller 7 may be implemented as a single integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A system for producing a tangible object, including:
   a space of predetermined thickness which can be filled with a fluid;
   a reference platform which at least partially defines at least one side of the space;
   a phase-transformer, for forming each of a first layer and a second layer of said object by selectively transforming the fluid into a solid in a predetermined area of said space, the forming of each of said layer including performing a first action with respect to said layer, said first action being selected from a group consisting of (a) initiating a step of separating said solid from said platform, (b) separating said solid from said platform, (c) finishing the step of separating said solid from said platform, (d) starting a step of providing the space of a predetermined thickness, and (e) completing the step of providing the space of predetermined thickness; the forming of each said layer further including determining a value of (a) a relative force exerted between the reference platform and the solid for separating said solid from said reference platform or (b) a parameter which is predictive of said relative force;
   an actuator for separating each of said layers from said reference platform by moving the reference platform relative to another side of the space or vice versa; and
   a controller connected with an actuator control output to said actuator and/or with a transformer control output to said phase transformer, said controller being configured and effective (a) to control a period of time or a moment in time for the first action with respect to the first layer based on the determined value for the first layer and (b) to control a period of time or a moment in time for the first action with respect to the second layer based on the determined value for the second layer, wherein the determined value for the first layer is different from the determined value of the second layer, whereby a time to produce the tangible object is reduced.

2. A system according to claim 1, further including:
   a sensor for sensing said relative force or the parameter which is predictive of said relative force, and
   wherein said controller is connected with a control input to said sensor, for receiving said determined value.

3. A system according to claim 2, wherein said sensor includes a force sensor for measuring a force parallel or opposite to a direction of movement of the first layer, the second layer or the reference platform.

4. A system according to claim 2, wherein said sensor includes a three-point force measurement system.

5. A system according to claim 1, wherein said controller is configured and effective to determine from the relative force value the period of time for the first action.

6. A system according to claim 1, wherein said controller includes a timer, for controlling the actuator based on the determined value as a function of time.

7. A system according to claim 1, wherein said controller includes a comparator connected to a controller input of the controller and to a memory in which a force threshold is stored, for limiting the moving or velocity of the moving in case said determined value exceeds the force threshold.

8. A system according to claim 7, wherein said force threshold is stored as a function of time.

9. A system according to claim 1, wherein said reference platform can be pivoted relative to each of said layers, for at least partially separating the reference platform and the respective layer and/or the respective layer can be moved in a direction away from the reference platform, for providing a space between the reference platform and the respective layer in which a following layer of the object can be produced.

10. A system according to claim 1, further including
    a memory in which a model of forces acting on one or more of the layers or the reference platform is stored and wherein the controller includes a control input for receiving data suitable to be inputted in the model to determine said force.

11. A system according to claim 1, further including:
    a carrier platform which defines a side of the space opposite to the side defined by said reference platform, to which one or more of said layers may be suspended from said carrier platform for moving the layer relative to the reference platform; and
    wherein said actuator can move said carrier platform relative to the reference platform, for separating the layer suspended to the carrier platform from the reference platform.

12. A system according to claim 11, wherein said carrier platform provides a top side of the space and said reference platform defines a bottom side of the space, and said carrier platform is moved upwards and/or said reference platform is moved downwards to separate the layer from the reference platform.

13. A system according to claim 1, wherein the reference platform includes an anti-stick layer which forms a wall of the space.

14. A system according to claim 1, wherein said fluid can be transformed into a solid by energy and the phase-transformer includes a source of energy which can selectively provide the energy to the predetermined area.

15. A system according to claim 14, wherein:
said source of energy includes a source of electro-magnetic radiation;
the reference platform includes a window which is transparent to said radiation; and said system further includes a projection unit for projecting the electromagnetic radiation through the window onto the predetermined area.

16. A system according to claim 1, wherein the phase-transformer can initiate a chemical reaction of a component in the fluid which results in a solid reaction product.

17. A system according to claim 5, wherein said first action is for separating one of the layers from the reference platform and/or for transforming the fluid into a solid and/or for a cycle of forming a following layer of said tangible object.

18. A system according to claim 16, wherein the chemical reaction results in a solid reaction product via curing a liquid resin by electro-magnetic radiation.

19. A method according to claim 1, wherein, when the determined value for the first layer is different from the determined value of the second layer, the period of time or the moment in time is changed.

20. A method for producing a tangible object, including forming a first layer having a first predetermined shape and a second layer having a second predetermined shape, said forming of each layer including:
providing a liquid filled space of predetermined thickness of which at least one side is at least partially defined by a platform;
transforming said liquid into a solid in a predetermined area of the space corresponding to the respective predetermined shape;
separating said solid from said platform by moving the platform relative to another side of the space or vice versa;
said forming of each layer further including determining a value of (a) a relative force exerted between the platform and the solid for said separating said solid from said platform or (b) a parameter which is predictive of said relative force;
the forming of each layer including performing a first action with respect to said layer, said first action being selected from a group consisting of (a) initiating a step of separating said solid from said platform, (b) separating said solid from said platform, (c) finishing the step of separating said solid from said platform, (d) starting a step of providing the space of a predetermined thickness, and (e) completing the step of providing the space of predetermined thickness;
the method including controlling a period of time or a moment in time for the first action with respect to the first layer based on the determined value for the first layer and controlling a period of time or a moment in time for the first action with respect to the second layer based on the determined value for the second layer, wherein the determined value for the first layer is different from the determined value for the second layer, whereby a time to produce the tangible object is reduced.

21. A method according to claim 20, further including forming a following third layer with a predetermined shape by providing a space between said separated solid and said platform, filling said space between said separated solid and said platform with a liquid and repeating said transforming and separating.

22. A method according to claim 20, wherein said forming of said first layer includes determining the value of the relative force exerted between the platform and the solid for said separating said solid from said platform.

23. A controller configured and adapted for a system according to claim 1.

24. A computer program, including program code portions provided on a data carrier, configured and effective to perform the function of a controller according to claim 23 when run on a programmable apparatus.

* * * * *